(12) United States Patent
Woo

(10) Patent No.: US 8,940,428 B2
(45) Date of Patent: Jan. 27, 2015

(54) SEPARATOR, A LITHIUM RECHARGEABLE BATTERY USING THE SAME AND A METHOD OF MANUFACTURE THEREOF

(75) Inventor: Soonki Woo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1428 days.

(21) Appl. No.: 11/723,148

(22) Filed: Mar. 16, 2007

(65) Prior Publication Data

US 2007/0224496 A1    Sep. 27, 2007

(30) Foreign Application Priority Data

Mar. 21, 2006 (KR) .................. 10-2006-0025592

(51) Int. Cl.
H01M 2/14 (2006.01)
H01M 2/16 (2006.01)
H01M 2/18 (2006.01)

(52) U.S. Cl.
CPC .......... *H01M 2/1653* (2013.01); *H01M 2/1686* (2013.01); *H01M 2/18* (2013.01)
USPC ........................................................ 429/129

(58) Field of Classification Search
USPC ........................................................ 429/144
See application file for complete search history.

(56) References Cited

U.S. PATENT DOCUMENTS

2002/0102455 A1* 8/2002 Daroux et al. .............. 429/144
2003/0194601 A1* 10/2003 Lei ............................... 429/61

FOREIGN PATENT DOCUMENTS

| EP | 1 401 037 | 3/2004 |
| JP | 09-161756 | 6/1997 |
| JP | 11-213979 | 8/1999 |
| JP | 2001-273880 | 10/2001 |
| JP | 2002-015720 | 1/2002 |
| KR | 1020030094696 A | 12/2003 |
| KR | 1020050079898 A | 8/2005 |

* cited by examiner

*Primary Examiner* — Ula C. Ruddock
*Assistant Examiner* — Jacob Marks
(74) *Attorney, Agent, or Firm* — Robert E. Bushnell, Esq.

(57) ABSTRACT

A separator, a lithium rechargeable battery using the separator, and a method of manufacturing the lithium rechargeable battery. More particularly, a separator in which a plurality of porous films having different strength from one another are disposed between a positive electrode plate and a negative electrode plate. A porous film having a higher tensile strength is disposed at a region adjacent to the negative electrode plate, and the other porous film is disposed adjacent the positive electrode plate. The porous film having the higher tensile strength has smaller holes and/or is thicker than the other porous film. The separator improves the stability of the battery by improving the prevention of an electrical short occurring between the two electrode plates of the electrode assembly, and a lithium rechargeable battery using the same.

6 Claims, 4 Drawing Sheets

SEPARATOR, A LITHIUM RECHARGEABLE BATTERY USING THE SAME AND A METHOD OF MANUFACTURE THEREOF

CLAIM OF PRIORITY

This application makes reference to, incorporates the same herein, and claims all benefits accruing under 35 U.S.C.§119 from an application entitled SEPARATOR AND LITHIUM RECHARGABLE BATTERY USING THE SAME earlier filed in the Korean Intellectual Property Office on 21 Mar. 2006 and there duly assigned Serial No. 10-2006-0025592.

BACKGROUND OF THE INVENTION

1. Field of the invention

The present invention relates to a separator and a lithium rechargeable battery using the separator, and more particularly, to a separator in which a plurality of porous films having different strength from one another is disposed between a positive electrode plate and a negative electrode plate, thereby retaining an electrolyte due to a space formed among the porous films and improving stability by preventing an electrical short occurring between the two electrode plates of the electrode assembly, and a lithium rechargeable battery using the same.

2. Description of the Related Art

Recently, as demands for portable electronic apparatuses such as camcorders, portable computers, and mobile phones have increased, rechargeable batteries have been actively researched and developed. Examples of the rechargeable batteries include a nickel cadmium (Ni—Cd) battery, a nickel hydride (Ni-MH) battery, a nickel zinc (Ni—Zn) battery, and a lithium rechargeable battery. Particularly, the lithium rechargeable battery can be downsized and provide a big capacity. Further, the lithium rechargeable battery has a high operating voltage and a high energy density per unit weight. Therefore, the demands for the lithium rechargeable battery have rapidly increased.

The lithium rechargeable battery may be combined with a fuel cell to be used as one component of a hybrid battery. With the technical advances, more lithium rechargeable batteries are used for a high power battery. In this case, the lithium rechargeable battery requires a high output. Thus, a research for improving safety of the lithium rechargeable battery has been actively conducted. In a typical lithium rechargeable battery, one separator is disposed between a positive electrode plate and a negative electrode plate, and another separator is disposed at the outer side of the positive electrode plate. Thereafter, this is wound using a down coiler to form an electrode assembly. The separators have a thickness of 15~30 µm. If an active material particle, which has a diameter larger than the above thickness, makes a hole in a separator, an internal electrical short may occur. If a thickness of the separator becomes extremely thick so as to avoid the above problem, not only an internal resistance increases, but also a volume of the separator becomes large. Thus, a thickness of an electrode plate needs to be reduced, which leads to deterioration of battery capability. The separator is made of a material that does not have good affinity to an electrolyte, such as polyethylene. Accordingly, in an electrode assembly including one film separator disposed between the positive electrode plate and the negative electrode plate and one film separator disposed at the outer side of the positive electrode plate, there is a drawback of the electrolyte between two electrodes, and thus lithium ion cannot easily move.

SUMMARY OF THE INVENTION

The present invention provides a separator in which a plurality of porous films having different strength from one another is disposed between a positive electrode plate and a negative electrode plate, thereby retaining an electrolyte due to a space formed among the porous films and improving stability by preventing an electrical short occurring between the two electrode plates of the electrode assembly, and a lithium rechargeable battery using the same.

According to an aspect of the present invention, there is provided a separator for a lithium rechargeable battery which is disposed between a positive electrode plate and a negative electrode plate, has at least two overlapping porous films each having a different pore size, and has a space between the porous films to be filled with an electrolyte.

In the aforementioned aspect of the present invention, a porous film adjacent to the negative electrode plate may have a smaller pore size than a porous film adjacent to the positive electrode plate.

In addition, in the separator, the porous film adjacent to the negative electrode plate and the porous film adjacent to the positive electrode plate may have different tensile strength from each other.

In addition, in the separator, the porous film adjacent to the negative electrode plate may have a greater tensile strength than the porous film adjacent to the positive electrode plate.

In addition, in the separator, the porous film adjacent to the negative electrode plate and the porous film adjacent to the positive electrode plate may have a different film thickness from each other.

In addition, the porous film adjacent to the negative electrode plate may have a greater thickness than the porous film adjacent to the positive electrode plate.

According to another aspect of the present invention, there is provided a lithium rechargeable battery comprising: an electrode assembly having a positive electrode plate, a negative electrode plate facing the positive electrode plate, and a separator disposed between the positive electrode plate and the negative electrode plate; a can which contains the electrode assembly; and a cap assembly which seals an upper opening portion of the can, wherein the separator is constructed by overlapping at least two porous films having a different pore size, and a space exists between the porous films to be filled with an electrolyte.

In the aforementioned aspect of the present invention, a porous film adjacent to the negative electrode plate may have a smaller pore size than a porous film adjacent to the positive electrode plate.

In addition, in the separator, the porous film adjacent to the negative electrode plate and the porous film adjacent to the positive electrode plate may have a different tensile strength from each other.

In addition, in the separator, the porous film adjacent to the negative electrode plate may have a greater tensile strength than the porous film adjacent to the positive electrode plate.

In addition, in the separator, the porous film adjacent to the negative electrode plate and the porous film adjacent to the positive electrode plate may have different film thickness from each other.

In addition, in the separator, the porous film adjacent to the negative electrode plate may have a greater thickness than the porous film adjacent to the positive electrode plate.

According to yet another aspect of the present invention, there is provided a lithium rechargeable battery comprising: a positive electrode plate and a negative electrode plate; and a separator disposed between the positive electrode plate and the negative electrode plate, the separator having at least two overlapping porous films each having a different tensile strength from one another.

In the aforementioned aspect of the present invention, one of the porous films is disposed adjacent to the negative electrode plate and has a greater thickness and higher tensile strength than another of the porous films disposed adjacent to the positive electrode plate.

In the aforementioned aspect of the present invention, one of the porous films is disposed adjacent to the negative electrode plate and has a smaller pore size than another of the porous films disposed adjacent to the positive electrode plate.

In the aforementioned aspect of the present invention, the overlapping porous films are separated by a space in which an electrolyte is disposed.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to accompanying drawings. Although a rectangular lithium rechargeable battery is depicted in the drawings, the present invention will be also applied to a cylindrical or pouch-shaped lithium rechargeable battery.

Figure 1:
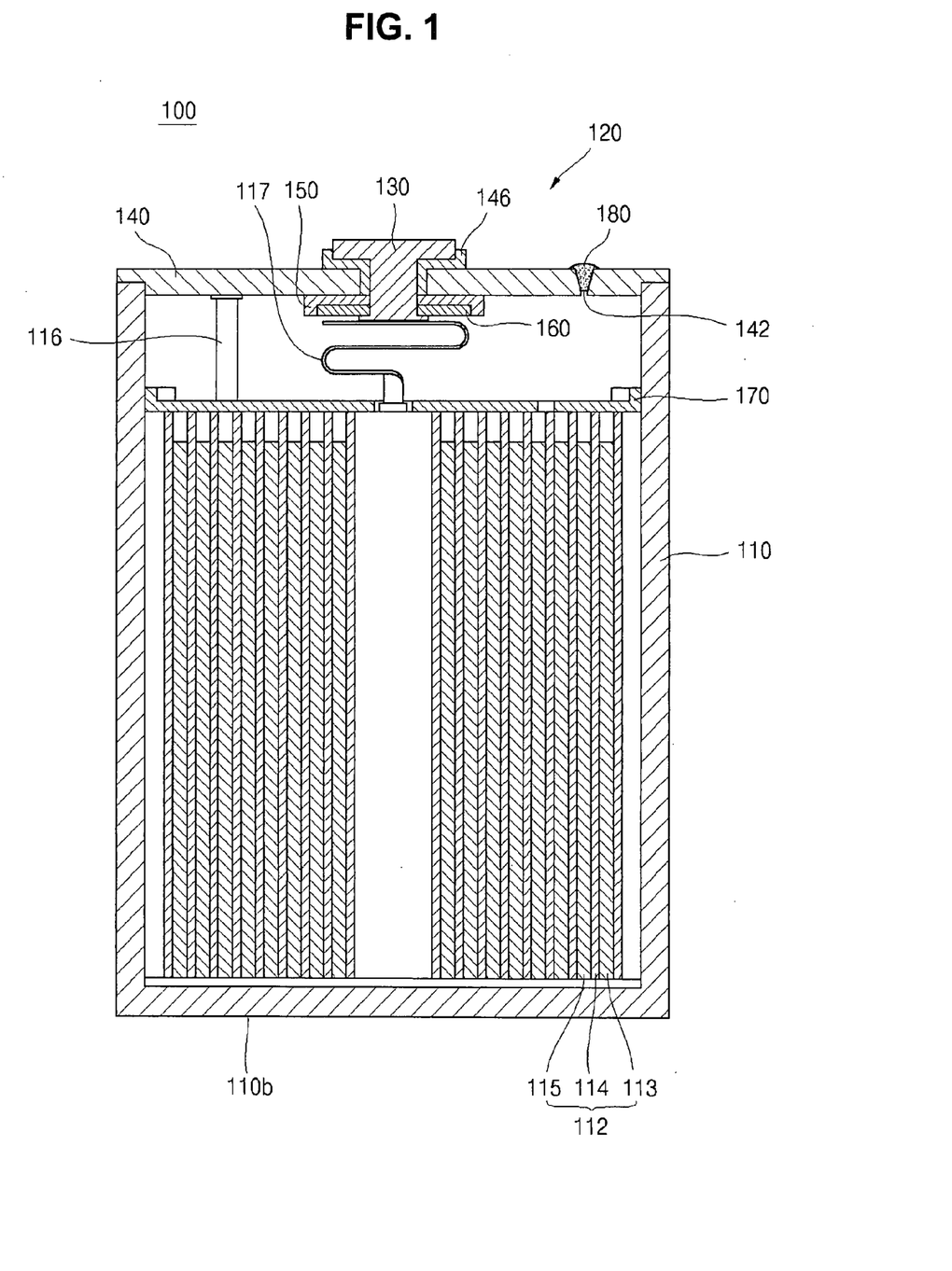
FIG. 1 is a vertical cross-sectional view of a typical lithium rechargeable battery.

FIG. 1 is a vertical cross-sectional view of a typical lithium rechargeable battery.

A lithium rechargeable battery 100 is constructed by containing an electrode assembly 112 including a positive electrode plate 113, a negative electrode plate 115, and a separator 114 together with an electrolyte in a can 110 and by sealing an upper opening portion of the can 110 with a cap assembly 120.

In general, the can 110 is made of aluminum or an aluminum alloy, and is manufactured using a deep drawing method. A bottom surface 110b of the can 110 is substantially flat.

The electrode assembly 112 is constructed by winding the positive electrode plate 113 and the negative electrode plate 115, with the separator 114 being disposed therebetween. A positive electrode tab 116 is connected to the positive electrode plate 113 and is protruded from the upper portion of the electrode assembly 112. A negative electrode tab 117 is connected to the negative electrode plate 115 and is protruded from the upper portion of the electrode assembly 112. In the electrode assembly 112, the positive electrode tab 116 and the negative electrode tab 117 are spaced apart by a predetermined distance, and are electrically insulated. In general, the positive electrode tab 116 and the negative electrode tab 117 are made of a nickel metal.

The cap assembly 120 includes a cap plate 140, an insulating plate 150, a terminal plate 160, and an electrode terminal 130. The cap assembly 120 is connected to an additional insulating case 170. Also, the cap assembly 120 is connected to the upper opening portion of the can 110, thereby sealing the can 110. The cap plate 140 is composed of a metal plate having a size and shape corresponding to those of the upper opening portion of the can 110. The center portion of the cap plate 140 is provided with a first terminal hole having a predetermined size. When the electrode terminal 130 is inserted through the first terminal hole, the outer surface of the first terminal hole is provided with a gasket tube 146 having a shape of tube in order to electrically insulate the electrode terminal 130 from the cap plate 140.

The right side of the cap plate 140 is provided with an electrolyte injection hole 142 having a predetermined size. After the cap assembly 120 is engaged with the upper opening portion of the can 110, an electrolyte is injected through the electrolyte injection hole 142. Thereafter, the electrolyte injection hole 142 is sealed with a sealing element 180.

The electrode terminal 130 is connected to the negative electrode tab 117 of the negative electrode plate 115 or the positive electrode tab 116 of the positive electrode plate 113, thereby functioning as a positive terminal or a negative terminal.

The insulating plate 150 is made of an insulating material such as a gasket, and is connected to the bottom surface of the cap plate 140. The insulating plate 150 is provided with a second terminal hole through which the electrode terminal 130 is inserted and which is located in a corresponding position of the first terminal hole of the cap plate 140. The lower side of the insulating plate 150 is provided with a mounting notch having a size suitable for mounting the terminal plate 160.

In general, the terminal plate 160 is made of a nickel alloy, and is placed on the lower side of the insulating plate 150. The terminal plate 160 is provided with a third hole through which the electrode terminal 130 is inserted and which is located in a corresponding position of the first terminal hole of the cap plate 140. Since the electrode terminal 130 is insulated by the gasket tube 146, and is connected through the first terminal hole of the cap plate 140, the terminal plate 160 is electrically insulated from the cap plate 140, and is electrically connected to the electrode terminal 130.

The negative electrode tab 117 connected to the negative electrode plate 115 is welded at one side of the terminal plate 160. The positive electrode tab 116 connected to the positive electrode plate 113 is welded at the left side of the cap plate 140. A resistance welding or a laser welding may be used to bond the negative electrode tab 117 and the positive electrode tab 116. In general, the resistance welding is used.

Now, a lithium rechargeable battery will be described according to an embodiment of the present invention.

Figure 2A:
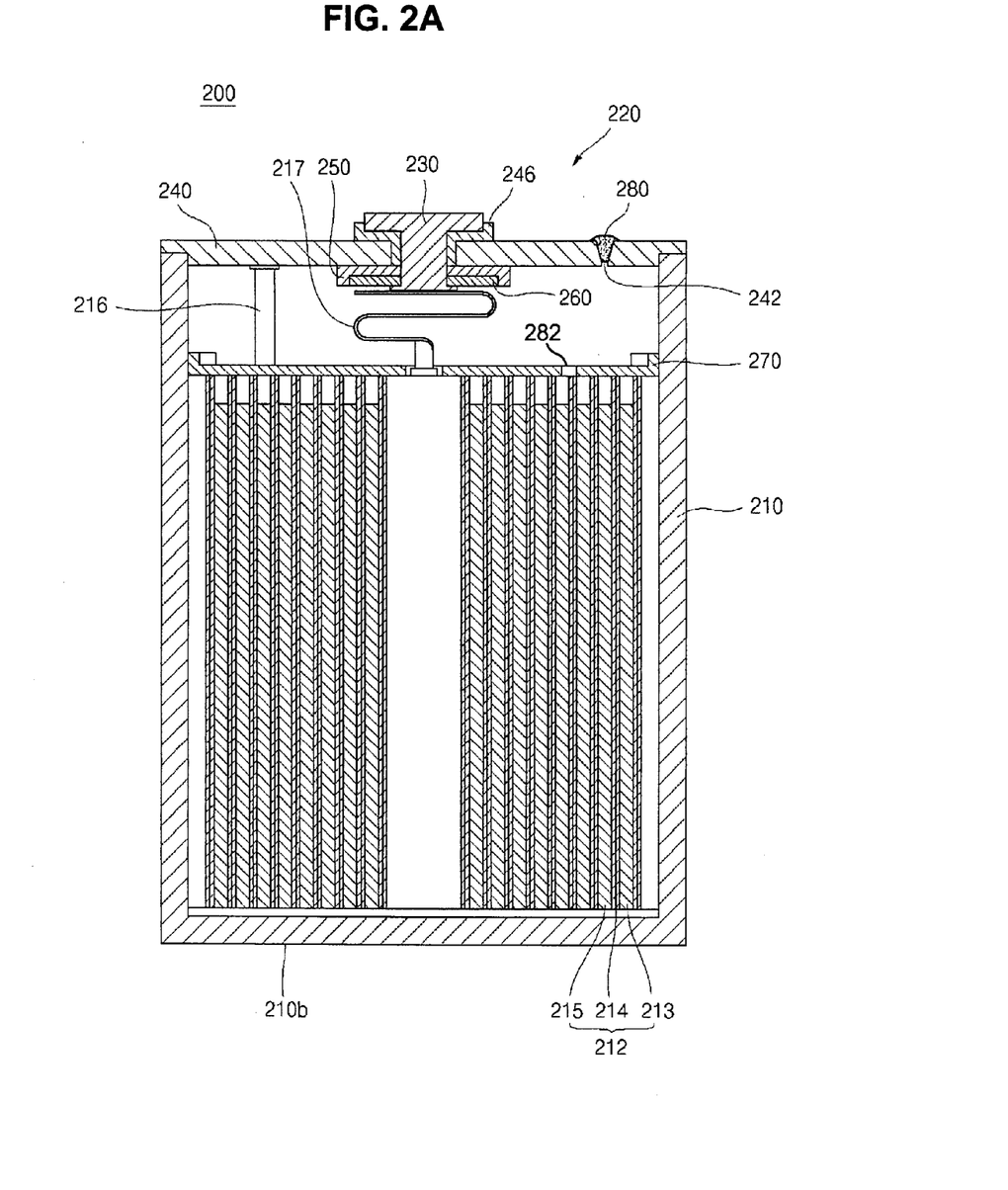
FIG. 2A is a vertical cross-sectional view of a lithium rechargeable battery according to an embodiment of the present invention.
Figure 2B:
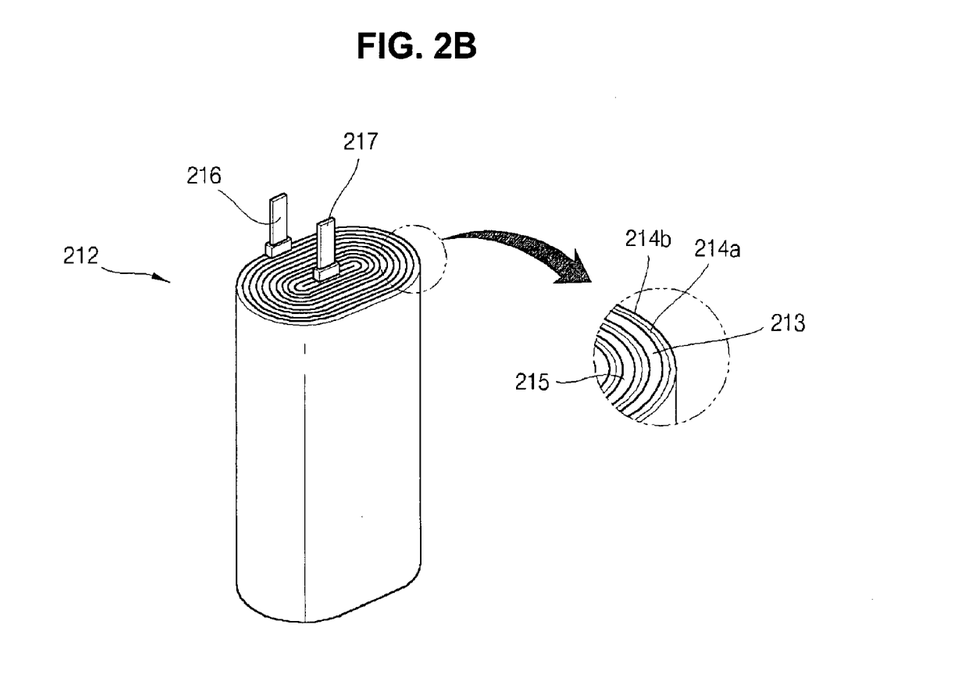
FIG. 2B is a perspective view of an electrode assembly according to an embodiment of the present invention.
Figure 2C:
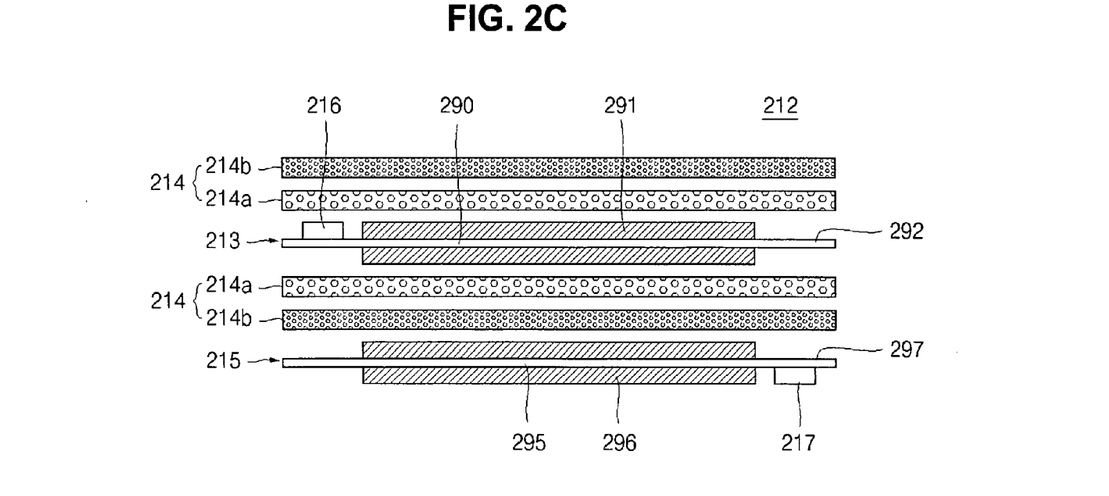
FIG. 2C is a horizontal cross-sectional view of the electrode assembly of FIG. 2B prior to be wound.

FIG. 2A is a vertical cross-sectional view of a lithium rechargeable battery according to an embodiment of the present invention. FIG. 2B is a perspective view of an electrode assembly according to an embodiment of the present invention. FIG. 2C is a horizontal cross-sectional view of the electrode assembly of FIG. 2B prior to be wound.

Referring to FIG. 2A, a lithium rechargeable battery 200 includes an electrode assembly 212, a can 210, and a cap assembly 220.

Referring to FIGS. 2B and 2C, the electrode assembly 212 includes a positive electrode plate 213, a negative electrode plate 215, and a separators 214. One end of the positive electrode plate 213 is attached with a positive tab 216. One end of the negative electrode plate 215 is attached with a negative tab 217.

The positive electrode plate 213 includes a positive electrode collector 290 which collects electrons generated through a chemical reaction and transfers the electrons to an external circuit, a positive electrode active material 291 which is coated on one surface or both surfaces of the positive electrode collector 290 and can intercalate and deintercalate (de-intercalate) lithium ions reversibly during the processes of battery discharge and charge, and a positive electrode uncoated portion 292 in which the positive electrode collector 290 is not coated with the positive electrode active material 291. The positive electrode tab 216, which transfers the electrons collected in the positive electrode collector 290 to the external circuit, is welded to the positive electrode uncoated portion 292 using an ultrasonic welding process. However, a welding process of the positive electrode tab 216 is not limited to the ultrasonic welding process. The positive electrode collector 290 is made of a metal material such as aluminum (Al). The positive electrode tab 216 is also made of a metal material such as aluminum (Al). The positive electrode active material 291 is formed by combining a conductive material and a binder with a metal oxide that can produce lithium ion.

On the other hand, the negative electrode plate 215 includes a negative electrode collector 295 which collects electrons generated through a chemical reaction and transfers the electrons to an external circuit, a negative electrode active material 296 which is coated on one surface or both surfaces of the negative electrode collector 295 and can intercalate and deintercalate lithium ions reversibly during the processes of battery discharge and charge, and a negative electrode uncoated portion 297 in which the negative electrode collector 295 is not coated with the negative electrode active material. The negative electrode collector 295 is made of a metal material such as copper (Cu) or nickel (Ni). However, a material constituting the negative electrode collector 295 is not limited thereto. The negative electrode active material 296 is formed by combining a conductive material and a binder with a carbon material. The negative tab 217 is disposed at one end of the negative electrode uncoated portion 297. The negative tab 217 transfers the electrons collected in the negative electrode collector 295 to the external circuit. The negative electrode tab 217 is welded to the negative electrode uncoated portion 297 using the ultrasonic welding process. However, a welding process of the negative electrode tab 217 is not limited to the ultrasonic welding process. The negative tab 217 is made of a metal material such as nickel (Ni). However, a material constituting the negative tab 217 is not limited thereto.

Referring to FIG. 2C, each separator 214 includes a porous film 214a adjacent to the positive electrode plate 213 (hereinafter referred to as a first film) and a porous film 214b adjacent to the negative electrode plate 215 (hereinafter referred to as a second film. Although each separator 214 is composed of the first film 214a and the second film 214b in the present embodiment, each separator 214 may further include a third film. One of the separators 214 is disposed between the positive electrode plate 213 and the negative electrode plate 215, and prevents an electrical short from occurring between the positive electrode plate 213 and the negative electrode plate 215.

The separators 214 are made of thermoplastic resin. The surface of the separators 214 has a porous film structure. If the thermoplastic resin having the porous film structure reaches around its melting point due to an increase in an internal temperature of a battery, the separators 214 begin to melt and thus pores are sealed, thereby forming an insulating film. This is called a separator sealing phenomenon or a shut down phenomenon. After the separators 214 change into the insulating film in this manner, the lithium ion cannot move between the positive electrode plate 213 and the negative electrode plate 215, and an electric current cannot flow therebetween. Thus, the internal temperature of the battery stops to rise.

One of the separators 214 is disposed between the positive electrode plate 213 and the negative electrode plate 215, and the other one is disposed at the outer side of the positive electrode plate 213. The other separator may be disposed at the inner side of the negative electrode plate 215 in place of the outer side of the positive electrode plate 213. When the electrode assembly 212 is wound, the positive electrode plate 213 is located at an outer circumference than the negative electrode plate 215. However, the negative electrode plate 215 may be located at the more outer circumference than the positive electrode plate 213. In this case, the separators 214 may have the same disposition as described above.

Hereinafter, the case that the positive electrode plate 213 is located at the more outer circumference than the negative electrode plate 215 will be exemplified. Only one separator 214 may be located at the outer side of the positive electrode plate 213 or the inner side of the negative electrode plate 215. Three separators 214 may be respectively located between the positive electrode plate 213 and the negative electrode plate 215, at the outer side of the positive electrode plate 213, and at the inner side of the negative electrode plate 215. A plurality of porous films having a different strength from one another is laminated to form the separators 214. In this case, the separators 214 have to ensure a space to be filled with the electrolyte among the films. The space is required to allow that the plurality of films can be used to retain the electrolyte though the separator 214 which is made of a material that does not have a good affinity to the electrolyte. Accordingly, the separators 214 allow lithium ions to move easily inside the electrolyte.

One of the first films 214a is adjacent to the positive electrode plate 213. Specifically, one of the first films 214a is disposed between the positive electrode plate 213 and any one of the second films 214b, and the other one is disposed at the outer side of the positive electrode plate 213. One of the second films 214b is adjacent to the negative electrode plate 213. Specifically, one of the second films 214b is disposed between the negative electrode plate 215 and one of the first films 214a, and the other one is disposed at the outer side of one of the first films 214a.

As shown in FIG. 2A, the first films 214a and the second films 214b are located slightly higher than the positive electrode plate 213 and the negative electrode plate 215, so that the positive electrode plate 213 and the negative electrode plate 215 are not deformed due to the insulating case 270.

In this case, the first films 214a and the second films 214b have a different porosity characteristic from each other. A tensile strength of the separators may not coincide with each other because size and density of pores formed on each of the first and second films 214a and 214b are different from each other. This phenomenon is referred to as a porosity characteristic. The porosity characteristics of the first and second films 214a and 214b are designed in a different manner under the assumption that the first and second films 214a and 214b have the same thickness and are made of the same material. However, the first and second films 214a and 214b may not only have different porosity characteristics but also be made of different materials with different thickness.

The first and second films 214a and 214b of each separator 214 have a different tensile strength with each other. The second film 214b has a greater tensile strength than the first film 214a. The first film 214a has a larger pore size than the second film 214b. A pore portion has a lower strength than any other portions of the separators 214. Thus, the second film 214b has a larger strength than the first film 214a.

When charging is performed, electrode expansion occurs more in the negative electrode plate 215 than in the positive electrode plate 213. Thus, a negative active material can be easily detached, thereby deforming or damaging the separators 214. As a result, an electrical short may occur between the positive electrode plate 213 and the negative electrode plate 215. The negative electrode plate 215 may deform or damage the separators 214 since the negative electrode plate 215 has a larger heating value than the positive electrode plate 213. Therefore, it is desirable that the second film 214b has a smaller pore size than the first film 214a.

The pore size may be an individual pore size, or may be an average pore diameter. A ratio of an average pore diameter of the first film 214a to an average pore diameter of the second film 214b may be 1.2 to 10, preferably 2 to 5. If the above ratio is less than 1.2, the diameter of the first film 214a becomes similar to the diameter of the second film 214b. In this case, it becomes difficult to expect to achieve advantages of the present invention. Further, there is a problem in that a low temperature characteristic and a cycle characteristic may deteriorate. On the other hand, if the above ratio is greater than 10, the pore size of the first film 214a becomes too large. As a result, an error rate may increase when a battery is manufactured.

The average pore diameter of the first film 214a may be 0.1 to 0.15 μm. The average pore diameter of the second film 214b may be 0.2 to 0.5 μm. If the average pore diameters are out of the above desired range, an error rate of the battery and a low temperature characteristic of the battery may deteriorate. However, the present invention is not limited to the above average diameter or the ratio of the average diameter of the first and second films 214a and 214b.

The first films 214a may be made of a material different from that of the second films 214b. The first films 214a may be made of polyethylene (PE), and the second films 214b may be made of polypropylene (PP). However, the separator 214 is not limited to the above materials. The break strength of PP is superior to PE. Since the melting point of PP is about 170° C., it is possible to cope with a melt down phenomenon in which a separator melts because an internal temperature of a battery becomes high. On the other hand, the break strength of PE is not excellent, and the melting point of PE is about 130° C. Thus, it is possible to cope with a shut down phenomenon in which pores are sealed.

Referring back to FIG. 2A, the can 210 has a substantial box shape, and includes a pair of long lateral walls having a substantial rectangular shape, a pair of short lateral walls, and a bottom surface 210b. Its upper portion is open, thereby forming an upper opening portion. The can 210 having a box shape may have a horizontal cross-section in the form of a square or an ellipse. The upper opening portion is inserted with the electrode assembly 212. An electrolyte is infused so that the electrolyte is impregnated into the electrode assembly 212, thereby permitting lithium ion to move. The can 210 is generally made of a material light in weight such as aluminum (Al). The upper portion of the can 210 is sealed with the cap assembly 220, so as to prevent the electrolyte from leaking. The can 210 may be formed using a deep drawing method. The long lateral walls, the short lateral walls, and the bottom surface 210b may be formed in an integrated manner.

The cap assembly 220 includes a cap plate 240, an insulating plate 250, a terminal plate 260, and an electrode terminal 230. The cap assembly 220 is connected to an additional insulating case 270. Also, the cap assembly 220 is connected to an upper opening portion of the can 210, thereby sealing the can 210.

The cap plate 240 is welded to the upper opening portion of the can 210 so as to seal the can 210. The right side of the cap plate 240 is provided with an electrolyte inserting hole 242. The inserting hole 242 is pressed and welded using a ball 280 or its equivalent. A corresponding electrolyte inserting hole 282 is provided through insulating case 270. The center portion of the cap plate 240 is provided with a first terminal hole. The electrode terminal 230 that is insulated by a gasket tube 246 is inserted through the terminal hole.

The insulating plate 250 is made of an insulating material such as a gasket, and is connected to the bottom surface of the cap plate 240. The insulating plate 250 is provided with a second terminal hole through which the electrode terminal 230 is inserted and which is located in a corresponding position of the first terminal hole of the cap plate 240. The lower side of the insulating plate 250 is provided with a mounting notch having a size suitable for mounting the terminal plate 260.

In general, the terminal plate 260 is made of a nickel alloy, and is placed on the lower side of the insulating plate 250. The terminal plate 260 is provided with a third hole through which the electrode terminal 230 is inserted and which is located in a corresponding position of the first terminal hole of the cap plate 240. Since the electrode terminal 230 is insulated by the gasket tube 246, and is connected through the first terminal hole of the cap plate 240, the terminal plate 260 is electrically insulated from the cap plate 240, and is electrically connected to the electrode terminal 230.

A negative electrode tab 217 connected to the negative electrode plate 215 is welded at one side the terminal plate 260. A positive electrode tab 216 connected to the positive electrode plate 213 is welded at the left side of the cap plate 240. A resistance welding or a laser welding may be used to bond the negative electrode tab 217 and the positive electrode tab 216. In general, the resistance welding is used.

The electrode terminal 230 is connected to the negative electrode tab 217 of the negative electrode plate 215 or the positive electrode tab 216 of the positive electrode plate 213, thereby functioning as a negative terminal or a positive terminal.

The inserting hole 242 is located at one side of the cap plate 240, and is sealed by pressing and welding using a soft metal of the ball 280. The welding is generally performed using a laser welding process around the inserting hole 242 pressed with the ball 280. After the welding is completed, a photosensitive material may be coated around the inserting hole 242 including the ball 280 so as to prevent the electrolyte from leaking.

Now, a lithium rechargeable battery according to another embodiment of the present invention will be described.

Figure 3:
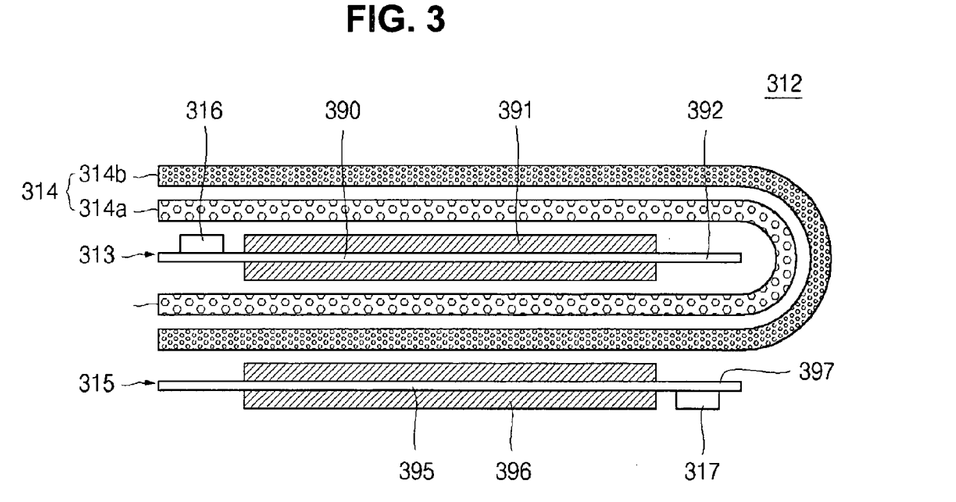
FIG. 3 is a horizontal cross-sectional view of an electrode assembly prior to be wound, according to another embodiment of the present invention.

FIG. 3 is a horizontal cross-sectional view of an electrode assembly prior to being wound, according to another embodiment of the present invention. The embodiment of FIG. 3 is similar to the embodiment of FIG. 2C, except that a separator 314 located between a positive electrode plate 313 and a negative electrode plate 315 and another separator 314 located at the outer side of the positive electrode plate 313 are connected with each other rather than separated from each other. Therefore, the following description will focus on difference.

A lithium rechargeable battery (not shown, see reference numeral 200 of FIG. 2A) according to the current embodiment of the present invention includes an electrode assembly 312, a can, and a can assembly. The can assembly 312 has been sufficiently described with reference to FIG. 2A. Thus, detailed description thereof will be omitted.

Referring to FIG. 3, the electrode assembly 312 includes a positive electrode plate 313, a negative electrode plate 315, and a separator 314. One end of the positive electrode plate 313 is attached with a positive electrode tab 316. One end of the negative electrode plate 315 is attached with a negative electrode tab 317. The positive electrode plate 313, the negative electrode plate 315, the positive electrode tab 316, and the negative electrode tab 317 are similar to those in the embodiment of FIG. 2C. Thus, detailed description thereof will be omitted.

Each separator 314 includes a first film 314a and a second film 314b. At least one separator 314 is disposed between the positive electrode plate 313 and the negative electrode plate 315, and covers the outer side of the positive electrode plate 313 so that the separator 314 can surround one end of the positive electrode plate 313.

That is, viewing from the positive electrode plate 313, the first film 314a firstly encompasses both sides of the positive electrode plate 313, and the second film 314b then encompasses the first film 314a. The average pore diameter of the first film 314a is larger than that of the second film 314b. The ratio of the average pore diameter of the first film 314a to the average pore diameter of the second film 314b may be 1.2 to 10, preferably, 2 to 5. The average pore diameter of the first film 314a may be 0.2 to 0.5 µm, preferably, 0.5 µm. The average pore diameter of the second film 314b may be 0.1 to 0.15 µm, preferably, 0.1 µm. The first film 314a may be made of PE, and the second film 314b may be made of PP. Since the separator 314 is not separated into two sections but is connected to become one piece, one step of a separator cutting process can be saved for each electrode assembly.

Now, a lithium rechargeable battery according to another embodiment of the present invention will be described.

Figure 4:
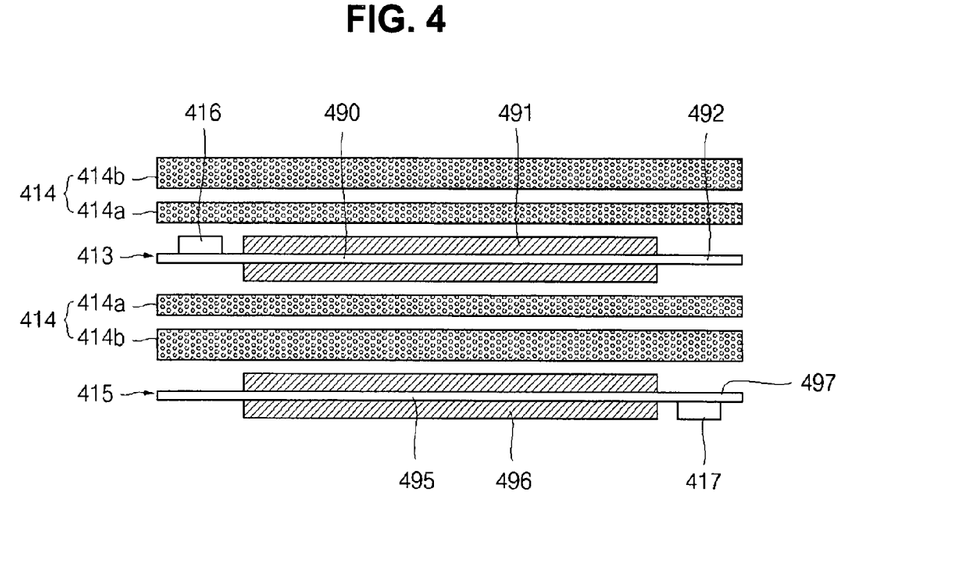
FIG. 4 is a horizontal cross-sectional view of an electrode assembly prior to be wound, according to anther embodiment of the present invention.

FIG. 4 is a horizontal cross-sectional view of an electrode assembly prior to be wound, according to anther embodiment of the present invention. The embodiment of FIG. 4 is similar to the embodiment of the FIG. 2C, except that a thickness of a first film 414a is different from that of a second film 414b. Therefore, the following description will be focus on difference. A separator 414 of the current embodiment may be composed of two independent films as shown in FIG. 2C, or may be connected with each other to become one piece as shown in FIG. 3. That is, the embodiment of FIG. 4 may be selected from the embodiment of FIG. 2 and the embodiment of FIG. 3.

A lithium rechargeable battery (not shown, see reference numeral 200 of FIG. 2A) according to the current embodiment of the present invention includes an electrode assembly 412, a can, and a can assembly. The can assembly 312 has been sufficiently described with reference to FIG. 2A. Thus, detailed description thereof will be omitted.

Referring to FIG. 4, the electrode assembly 412 includes a positive electrode plate 413, a negative electrode plate 415, and a separator 414. One end of the positive electrode plate 413 is attached with a positive electrode tab 416. One end of the negative electrode plate 415 is attached with a negative electrode tab 417. The positive electrode plate 413, the negative electrode plate 415, the positive electrode tab 416, and the negative electrode tab 417 are similar to those in the embodiment of FIG. 2C. Thus, detailed description thereof will be omitted.

Each separator 414 includes a first film 414a and a second film 414b. At least one separator 414 is disposed between the positive electrode plate 413 and the negative electrode plate 415. An additional separator is disposed at the outer side of the positive electrode plate 413 or at the inner side of the negative electrode plate 415. The second film 414b may be thicker than the first film 414a. The second film 414b may be thicker than the first film 414a, while having the same average pore diameter as the first film 414a. Alternatively, the second film 414b may be thicker than the first film 414a, while having a larger average pore diameter than the first film 414a.

The second film 414b may be thicker than the first film 414a, while being made of the same material as the first film 414a. Alternatively, the second film 414b may be thicker than the first film 414a, while being made of a material different from that of the first film 414a.

That is, the first film 414a may be relatively thin and be made of PE, and the second film 414b may be relatively thick and be made of PP. A thickness ratio of the first film 414a to the second film 414b may be 25% to 70%, preferably, 45% to 55%. If the thickness ratio is less than 25%, a low temperature characteristic of battery deteriorates. If the thickness ratio is greater than 70%, a shut down speed of separator becomes low. The first film 414a may have a thickness of 5 to 10 µm. The second film 414b may have a thickness of 15 to 20 µm. In the separators 414, if the second film 414b is thicker than the first film 414a, the separators 414 can be prevented from deforming/damaging caused by deintercalation of a negative active material. However, the first film 414a and the second film 414b are not limited to the above thickness and the thickness ratio.

Now, the operation of a lithium rechargeable battery using a separator according to an embodiment of the present invention will be described. Hereinafter, the embodiment of using the separator of FIG. 2C will be exemplified.

The lithium rechargeable battery 200 includes the electrode assembly 212, the can 210, and the can assembly 220. The electrode assembly 212 includes the positive electrode plate 231, the negative electrode plate 215, and the separator 214. The separator 214 includes the first film 214a which has a low strength due to a large pore diameter and the second film 214b which has a high strength due to a small pore diameter.

When charging/discharging of battery is repeatedly carried out, the electrode assembly 212 becomes thick. In particular, a negative active material 296 relatively expands more than a positive active material during charging. In this case, the negative active material 296 may be deintercalated from the negative electrode collector 295, and thus be melted into an electrolyte existing between the negative electrode plate 215 and the second film 214b. Thus the deintercalated negative active material 296 presses the second film 214b. In particular, if the second film 214b has sharp edges, more force is locally applied to the second film 214b. However, since the second film 214b has a small pore size and a large tensile strength, the second film 214b is not damaged regardless of a force locally applied to the second film 214b by the deintercalated negative active material 296. Thus, an electric short can be prevented from occurring between the positive electrode plate 213 and the negative electrode plate 215. In addition, since the second film 214b is made of PP, lithium ion can pass therethrough without being shut down or melt down regardless of a significant heating value at a negative electrode side when discharging occurs. In addition, an electrolyte is retained in a narrow space formed between the first film 214a and the second film 214b, and thus lithium ion can move easily.

According to a lithium rechargeable battery of the present invention, a plurality of porous films having different strength from one another is disposed between a positive electrode plate and a negative electrode plate, a porous film having a higher strength is disposed at a region adjacent to the negative electrode plate, which has a high increasing rate in terms of thickness when charging and discharging are repeated and of which a foreign material can be easily extracted, and then an electrode assembly is wound, thereby increasing the amount of retained electrolyte between the electrodes due to a space formed among the porous films and improving stability by preventing an electrical short occurring between the two electrode plates of the electrode assembly.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A lithium rechargeable battery comprising:
   an electrode assembly having a positive electrode plate, a negative electrode plate, and a separator disposed between the positive electrode plate and the negative electrode plate;
   a can which contains the electrode assembly; and
   a cap assembly which seals an upper opening portion of the can,
   wherein the separator is constructed by overlapping at least two porous films having a different pore size, and a space separating the porous films, the space being filled with an electrolyte,
   wherein a porous film face-to-face with and adjacent to the negative electrode plate has a smaller pore size than a porous film face-to-face with and adjacent to the positive electrode plate, the porous film face-to-face with and adjacent to the negative electrode plate and the porous film face-to-face with and adjacent to the positive electrode plate having a different tensile strength from each other.

2. The lithium rechargeable battery according to claim 1, wherein, in the separator, the porous film adjacent to the negative electrode plate has a greater tensile strength than the porous film adjacent to the positive electrode plate.

3. The lithium rechargeable battery according to claim 1, wherein, in the separator, a porous film adjacent to the negative electrode plate and a porous film adjacent to the positive electrode plate have different film thickness from each other.

4. The lithium rechargeable battery according to claim 3, wherein, in the separator, the porous film adjacent to the negative electrode plate has a greater thickness than the porous film adjacent to the positive electrode plate.

5. A lithium rechargeable battery comprising:
   a positive electrode plate and a negative electrode plate; and
   a separator disposed between the positive electrode plate and the negative electrode plate, said separator having at least two overlapping porous films each having a different tensile strength from one another, said overlapping porous films being separated by a space in which an electrolyte is disposed, one of said porous films being face-to-face with and adjacent to the negative electrode plate and having a greater thickness and higher tensile strength than another of said porous films being face-to-face with and adjacent to the positive electrode plate.

6. The lithium rechargeable battery according to claim 5, one of said porous films being disposed adjacent to the negative electrode plate and having a smaller pore size than another of said porous films being disposed adjacent to the positive electrode plate.

* * * * *